United States Patent [19]

Machida et al.

[11] 4,116,698

[45] Sep. 26, 1978

[54] FERROCYANATE TREATING LIQUID FOR OFFSET MASTER

[75] Inventors: Hazime Machida; Hiroshi Tamura; Kakuji Murakami, all of Tokyo, Japan

[73] Assignee: Ricoh Co., Ltd., Tokyo, Japan

[21] Appl. No.: 836,055

[22] Filed: Sep. 23, 1977

Related U.S. Application Data

[63] Continuation-in-part of Ser. No. 749,385, Dec. 10, 1976, abandoned.

[30] Foreign Application Priority Data

Dec. 19, 1975 [JP] Japan ................................ 50-150537

[51] Int. Cl.[2] ......................... C09D 5/20; C09K 3/00; G03G 13/00

[52] U.S. Cl. .................................. 106/2; 252/62.1 L; 260/29.2 N; 260/29.6 HN; 260/29.6 MP; 260/29.6 MM

[58] Field of Search .............. 260/29.5 HN, 29.6 MP, 260/29.6 MM, 29.2 N; 106/2; 252/62.1 L

[56] References Cited

U.S. PATENT DOCUMENTS

| | | | |
|---|---|---|---|
| 3,244,658 | 4/1966 | Grosser et al. | 260/29.6 MP |
| 3,503,881 | 3/1970 | Shinohara et al. | 252/62.1 L |
| 3,522,062 | 7/1970 | Shimizu et al. | 106/2 |
| 3,632,362 | 1/1972 | Urushiyama et al. | 260/29.6 MP |
| 3,661,598 | 5/1972 | Rosenberger | 106/2 |
| 3,672,885 | 6/1972 | Ort | 96/1.8 |
| 3,687,694 | 8/1972 | Van Dusen | 106/2 |
| 3,764,353 | 10/1973 | Shimizu et al. | 106/2 |
| 3,769,043 | 10/1973 | Morishima et al. | 106/2 |
| 3,874,896 | 4/1975 | Machida et al. | 252/62.1 L |
| 4,007,126 | 2/1977 | Wheatland | 106/2 |

FOREIGN PATENT DOCUMENTS

| | | | |
|---|---|---|---|
| 272,838 | 11/1964 | Australia | 252/62.1 L |
| 2,221,028 | 11/1972 | Fed. Rep. of Germany | 252/62.1 L |
| 45-33,683 | 10/1970 | Japan | 106/2 |
| 46-21,244 | 6/1971 | Japan | 106/2 |

*Primary Examiner*—Ronald W. Griffin
*Attorney, Agent, or Firm*—Blanchard, Flynn, Thiel, Boutell & Tanis

[57] ABSTRACT

The present invention provides a treating liquid for use in treating offset masters which treating liquid consists essentially of ferrocyanate, water-soluble phosphate and a specific polymer or copolymer. By the use of this treating liquid, the durability of offset masters in printing can be remarkably enhanced.

10 Claims, No Drawings

FERROCYANATE TREATING LIQUID FOR OFFSET MASTER

CROSS-REFERENCE TO RELATED APPLICATION

This application is a continuation-in-part of Ser. No. 749,385, filed Dec. 10, 1976, now abandoned.

BACKGROUND OF THE INVENTION (a) Field of the Invention

The present invention relates to a treating liquid for offset masters, and particularly it relates to a treating liquid for the purpose of desensitizing an electrophotographic offset master having a photosensitive layer consisting essentially of fine zinc oxide powder and a binder in order that said offset master can be used as an offset printing plate.

(b) Description of the Prior Art

An electrophotographic offset master having a photosensitive layer consisting essentially of fine zinc oxide powder as photoconductive substance and a binder is generally prepared by the procedure comprising preparing an electrophotographic copying material by forming a photoconductive layer wherein fine zinc oxide powder, an insulating resin as the binder and, when necessary, sensitizing coloring matters, etc. are uniformly mixed together and coated on a support, forming a desired image on the photoconductive layer side of this copying material through the known steps, to wit, electrification, exposure and development, and thereafter treating it with a desensitizing liquid (hereinafter called 'treating liquid').

A treating liquid for this purpose desirably is capable of imparting a sufficient aptitude for offset printing to the offset master; for instance, it should have an intense desensitizability and be capable of facilitating the adhesion of printing ink onto the image area.

There have already been developed treating liquids for offset masters which can satisfy the foregoing requirements in some measure and such liquids have been put to practical use. To cite an example of a currently utilized treating liquid, there is one which consists essentially of ferrocyanate and water-soluble phosphate such as disclosed in Japanese Pat. Nos. 33683/1970, 21244/1971, etc. These ingredients are said to have the effect of making the non-image area of the offset master hydrophilic more rapidly and increasing the strength of the hydrophilic coating film formed on the nonimage area of the photoconductive layer. U.S. Pat. Nos. 3,522,062 and 3,769,043 disclose treating liquids which are intended to increase the strength of the hydrophilic coating film by adding a hydrophilic high molecular substance such as sodium alginate, polyacrylic acid or the like to said basic composition.

However, as a matter of fact, it has so far been impossible to prepare a satisfactory offset master by the use of the conventional treating liquids such as cited above.

That is to say, in order to obtain prints by the use of an offset master prepared as above, it is satisfactory to follow the procedure comprising setting the offset master around the plate holding cylinder of an offset printing machine, applying a 1 in 6–10 solution of treating liquid (to wit, wetting solution) all over the surface of the thus set offset master, inking over the offset master so as to make the printing ink adhere selectively to the image area thereof, transferring the thus applied printing ink onto a blanket, and transferring the printing ink held on the blanket onto a transfer paper consisting of ordinary paper. On this occasion, because an offset printing machine is so constructed as to actuate the plate holding cylinder or the blanket cylinder by means of a gear mechanism, an abrupt external force such as frictional force works on the contact surface between the offset master set around the plate holding cylinder and the blanket cylinder at the time of engagement of the teeth of the gears, and a spot of the contact surface subjected to said external force is apt to be smeared with ink somewhat earlier than where it is inked normally (this smearing of ink is hereinafter called 'gear-stripe'). And, in fact, occurrence of this 'gear-stripe' cannot be prevented by the use of the conventional treating liquids.

SUMMARY OF THE INVENTION

A principal object of the present invention is to provide a treating liquid for offset masters which can make an offset master hydrophilic very rapidly, form a hydrophilic coating film having an excellent water holding property and prevent the occurrence of gear-stripe. Another object of the present invention is to provide a treating liquid for offset masters which can enhance the printing durability conspicuously compared with the conventional treating liquids. A further object of the present invention is to provide a treating liquid for offset masters which can be utilized as the wetting solution upon diluting.

To be precise, the present invention relates to a treating liquid for offset masters which consists essentially of (1) ferrocyanate, (2) water-soluble phosphate and (3) at least one hydrophilic resin selected from the group consisting of homopolymer (degree of polymerization = 10–1000) of monomers to be expressed by the following general formula I, copolymer (degree of polymerization = 10–1000) of different kinds of monomers to be expressed by the general formula I and copolymer (degree of polymerization = 10–1000) of monomer to be expressed by the general formula I and monomer to be expressed by the following general formula II:

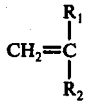

[wherein $R_1$ represents —H or —$CH_3$; and $R_2$ represents —$CONH_2$, —$CONHR_3$, —$CON(R_3)_2$, —$CONHCH_2OH$,

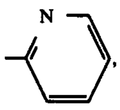
,

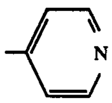
,

—$COO(CH_2)_2N(CH_3)_2$ or —$COO(CH_2)_2N(C_2H_5)_2$ (wherein $R_3$ represents alkyl group having 1-8 carbon atoms)]

(general formula II)

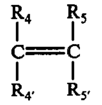

[wherein $R_4$ and $R_{4'}$ represent —H, —$CH_3$, —COOH, —$COOR_6$ or —COOMe; $R_5$ and $R_{5'}$ represent —H, —$CH_3$, —COOH, —$COOR_6$, —COOMe or —$CH_2COOH$ (wherein $R_6$ represents —$CH_3$ or —$C_2H_5$; Me represents Mg, Ba, Ca, Co, Mn, Fe, Ni or Zn); and $R_5 \neq R_{5'}$ when $R_4 = R_{4'}$, $R_5 = R_{5'}$ or $R_5 \neq R_{5'}$ when $R_4 \neq R_{4'}$]

The 'copolymer of different kinds of monomers to be expressed by the general formula I' herein means, for instance, a copolymer of monomer 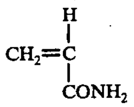 and monomer 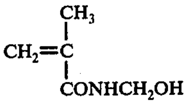

The reason for restricting the degree of polymerization of said specific polymer or copolymer to 10 to 1000 consists in that in case the degree of polymerization is less than 10 it leads to the occurrence of the 'gear-stripe' phenomenon, and in case the degree of polymerization is in excess of 1000 the viscosity of the treating liquid is raised to thus cause emulsification of ink, thereby making it impossible to obtain fully satisfactory printed matters.

DETAILED DESCRIPTION OF THE INVENTION

A treating liquid according to the present invention is, as described in the foregoing, prepared by adding the above specified polymer and (or) copolymer to ferrocyanate and water-soluble phosphate which consititute the fundamental ingredients of the conventional treating liquids.

As the ferrocyanate for use in the present invention, a ferrocyanate stable in aqueous solution thereof, such as sodium ferrocyanate, potassium ferrocyanate, etc., is employed; these ferrocyanates may be applied either individually or upon combining two or more of them. The desirable amount of ferrocyanate to be applied is more than 0.2 wt.% of the entirety of the treating liquid. As the water-soluble phosphate for use in the present invention, primary ammonium phosphate, secondary ammonium phosphate, primary sodium phosphate, secondary sodium phosphate, etc. are applicable; these phosphates may be employed either individually or upon combining two or more of them. The desirable amount of water-soluble phosphate to be applied is in the range of 0.1–12 wt.% of the entirety of the treating liquid.

This water-soluble phosphate forms a hydrophilic film through reaction with zinc oxide constituting the photoconductive substance within the photosensitive layer. The thus formed coating film has a good hydrophilic property but is poor in strength so that it occasionally comes off at the time of printing. However, when the foregoing ferrocyanate is admixed with this water-soluble phosphate, the strength of the hydrophilic coating film is increased and its durability in printing is improved.

In the case of a treating liquid consisting of the water-soluble phosphate and ferrocyanate, however, not only is it impossible to make both ingredients coexist stably for a long time, but also the aforesaid objects of the present invention cannot be achieved. But, all of these questions can be settled by making said two ingredients coexist with a hydrophilic resin consisting of the aforesaid specific polymer and (or) copolymer.

Said specific polymer and copolymer to be added to the ferrocyanate and water-soluble phosphate include polymer of monomers to be expressed by the general formula I, copolymer of different kinds of monomers to be expressed by the general formula I and copolymer of monomer to be expressed by the general formula I and monomer to be expressed by the general formula II, such as, for instance, polyacrylamide, acrylamide~N-dimethyl acrylamide copolymer, acrylamide~N-methyl acrylamide copolymer, acrylamide~ acrylic acid copolymer, dimethyl amino-ethyl methacrylate~λ maleic acid copolymer, N,N'-dioctyl acrylamide~fumaric acid copolymer and N-ethyl aminomethacrylate~itaconic acid copolymer, and these can be employed either individually or upon combining two or more of them. It has been confirmed through experiments conducted by the present inventors that, among these polymers and copolymers, acrylic acid~acrylamide copolymer is particularly effective. This is presumably ascribable to the fact that acrylic acid~acrylamide copolymer is a substance which is apt to form a chelate compound. The appropriate amount of these polymers and copolymers constituting the hydrophilic resin to be mixed with ferrocyanate and water-soluble phosphate is in the range of 0.1–10 wt.% — preferably 0.5–5 wt.% — of the entirety of the treating liquid: in the case where it is less than 0.1 wt.%, a satisfactory durability in printing cannot be expected of the master, while in the case where it is more than 10 wt.%, it works unfavorably in forming the hydrophilic coating film.

A treating liquid according to the present invention is, as stated above, prepared by dissolving (1) ferrocyanate, (2) water-soluble phosphate and (3) the aforesaid specific polymer and (or) copolymer in water. And, in order to obtain a more desirable treating liquid, it will do to add an organic acid such as tartaric acid, fumaric acid, malonic acid, etc., to the thus prepared treating liquid so as to hold the pH value below 6. For this purpose, addition of malonic acid is particularly desirable.

A treating liquid for an offset master obtained in this way well answers the purpose of the present invention. That is, by virtue of the addition of said specific hydrophilic resin, the water holding property of the hydrophilic coating film formed on the non-image area of the offset master is enhanced and, as a result, the occurrence of 'gear-stripe' can be prevented and the durability in printing is improved concurrently. In the case of the conventional offset masters, the improvement of the durability in printing has resorted to enhancement of the strength of hydrophilic coating film to be formed on the surface of master by applying a treating liquid and/or the speed of forming of said coating film, while in the case of the present invention, in addition to improvement in these respects, by virtue of enhancing the water holding property of the hydrophilic coating film, such unique effects as stated above are realized.

Moreover, when the present treating liquid is diluted with water into a 1 in 2–10 solution, said solution can serve as the wetting solution to be applied on the surface of the plate.

DESCRIPTION OF THE PREFERRED EMBODIMENTS

EXAMPLE 1

By forming a photoconductive layer on a supporting paper subjected to water-proofing process by coating a dispersion prepared by mixing photoconductive zinc-oxide with acrylic resin (as binder) and drying thereafter, an electrophotographic copying material was prepared.

On the other hand, by applying the following prescriptions (1) through (11), varieties of treating liquids according to the present invention were prepared, and by applying the prescriptions (12) through (16), varieties of comparative treating liquids were also prepared.

| | |
|---|---|
| Prescription (1) | |
| sodium ferrocyanate | 20 g |
| polyacrylamide | |
| (degree of polymerization = 1000) | 20 g |
| $(NH_4)_2HPO_4$ | 60 g |
| citric acid | 24 g |
| water | 1,000 ml |
| Prescription (2) | |
| potassium ferrocyanate | 30 g |
| acrylamide~acrylic acid copolymer | |
| (molar ratio = 3:1, degree of polymerization = 100) | 10 g |
| $Na_2HPO_4$ | 40 g |
| citric acid | 40 g |
| water | 1,000 ml |
| Prescription (3) | |
| sodium ferrocyanate | 25 g |
| dimethyl aminoethyl methacrylate~ | |
| maleic acid copolymer | |
| (molar ratio = 5:5, degree of polymerization = 10) | 40 g |
| sodium secondary phosphate | 50 g |
| citric acid | 30 g |
| water | 1,000 ml |
| Prescription (4) | |
| Potassium ferrocyanate | 15 g |
| N,N'-dioctyl acrylamide~fumaric acid | |
| copolymer | |
| (molar ratio = 3:7, degree of polymerization = 20 | 5 g |
| sodium tertiary phosphate | 20 g |
| tartaric acid | 10 g |
| water | 1,000 ml |
| Prescription (5) | |
| potassium ferrocyanate | 45 g |
| N-ethyl eminoethyl methacrylate~ | |
| itaconic acid copolymer | |
| (molar ratio = 7:3, degree of polymerization = 50) | 20 g |
| ammonium secondary phosphate | 30 g |
| malonic acid | 10 g |
| water | 1,000 ml |
| Prescription (6) | |
| sodium ferrocyanate | 30 g |
| methacryl amide~methacrylic acid | |
| copolymer | |
| (molar ratio = 5:5, degree of polymerization = 500 | 10 g |
| pyrophosphoric acid | 20 g |
| diammonium hydrogen phosphate | 40 g |
| malic acid | 10 g |
| water | 1,000 ml |
| Prescription (7) | |
| potassium ferrocyanate | 30 g |
| acrylic acid~acryl amide~methacrylic | |
| acid copolymer | |
| (molar ratio = 2:3:5, degree of polymerization = 200) | 5 g |
| diammonium hydrogen phosphate | 60 g |
| malonic acid | 30 g |
| water | 1,000 ml |
| Prescription (8) | |
| sodium ferrocyanate | 30 g |
| methyl methacrylate~N-methyl | |
| methacryl amide~maleic acid copolymer | |
| (molar ratio = 1:1:8, degree of polymerization = 70) | 5 g |
| carboxymethyl cellulose | 1 g |
| ammonium hydrogen phosphate | 40 g |

-continued

| | |
|---|---|
| diammonium hydrogen phosphate | 20 g |
| malonic acid | 30 g |
| water | 1,000 ml |
| Prescription (9) | |
| potassium ferrocyanate | 30 g |
| N, N'-dimethyl acrylamide~fumaric | |
| acid copolymer | |
| (molar ratio = 5:5, degree of polymerization = 15) | 10 g |
| sodium phosphate | 60 g |
| citric acid | 30 g |
| alginic acid | 0.5 g |
| water | 1,000 ml |
| Prescription (10) | |
| sodium ferrocyanate | 50 g |
| cobalt acrylate~acrylic acid~ | |
| N-methyl acrylamide copolymer | |
| (molar ratio = 1:5:4, degree of polymerization = 50) | 5 g |
| disodium phosphate | 100 g |
| sodium glutamate | 10 g |
| tartaric acid | 30 g |
| water | 1,000 ml |
| Prescription (11) | |
| potassium ferrocyanate | 45 g |
| N,N'-dimethyl methacrylamide~ | |
| calcium acrylate~acrylic acid | |
| copolymer | |
| (molar ratio = 3:2:5, degree of polymerization = 30) | 20 g |
| triammonium phosphate | 60 g |
| malonic acid | 30 g |
| water | 1,000 ml |
| Prescription (12) - comparative example | |
| sodium ferrocyanate | 20 g |
| sodium secondary phosphate | 60 g |
| citric acid | 40 g |
| water | 1,000 ml |
| Prescription (13) - comparative example | |
| sodium ferrocyanate | 20 g |
| vinyl pyrrolidone | 20 g |
| ammonium secondary phosphate | 60 g |
| citric acid | 24 g |
| water | 1,000 ml |
| Prescription (14) - comparative example | |
| sodium primary phosphate | 20 g |
| polyvinyl pyrrolidone | |
| (degree of polymerization = 70) | 20 g |
| citric acid | 10 g |
| water | 1,000 ml |
| Prescription (15) - comparative example | |
| sodium ferrocyanate | 20 g |
| ammonium secondary phosphate | 20 g |
| maleic anhydride~vinyl acetate | |
| copolymer | |
| (molar ratio = 5:5, degree of polymerization = 300) | 20 g |
| citric acid | 24 g |
| water | 1,000 ml |
| Prescription (16) - comparative example | |
| sodium ferrocyanate | 20 g |
| ammonium secondary phosphate | 20 g |
| polyacrylic acid | |
| (degree of polymerizatiion = 1000) | 20 g |
| citric acid | 24 g |
| water | 1,000 ml |

Next, after electrification of the foregoing electrophotographic copying material by corona discharge followed by exposure, by developing it with a dry developer (namely, Developer for S-1, a product of K. K. RICOH) and fixing by heating, a copied image was formed. A plurality of copying materials carrying the thus formed copied image were fed to RICOH ETCHING PROCESSOR, a product of K. K. RICOH, charged with various treating liquids according to the foregoing prescriptions, whereby a variety of offset masters were prepared.

Then, by setting each of these offset masters in an offset printing machine (namely, RICOH AP15110, a product of K. K. RICOH) and applying a 1 in 6 solution of each treating liquid as the wetting solution, printing of 5,000 copies each was carried out. When the condition of each offset master and the condition of the prints were examined upon obtaining 5,000 copies, the results were as shown in the following table, respectively.

| Prescription No. | Offset master | Print |
|---|---|---|
| (1) | | |
| (2) | | |
| (3) | | |
| (4) | | |
| (5) | | |
| (6) | | |
| (7) | | |
| (7) | | |
| (8) | | |
| (9) | | |
| (10) | | |
| (11) | | |
| (12) | X | XX |
| (13) | X | Δ |
| (14) | XX | XX |
| (15) | X | Δ |
| (16) | X | Δ |

Remarks)
Mark stands for 'No gear-stripe occurs.'
Mark Δ stands for 'Occurrence of gear-stripe is trifling.'
Mark X stands for 'Occurrence of gear-stripe is remarkable.'
Mark XX stands for 'Occurrence of gear-stripe is remarkable, and stains on the ground are also observed.'

EXAMPLE 2

When tests were conducted through the same procedure as in Example 1 save for replacing acrylic resin (the binder) in the photoconductive layer with silicone resin, styrene~acrylic resin, acrylic alkyd resin, styrene~butadiene copolymer, etc., practically the same results as in Example 1 were obtained.

EXAMPLE 3

A treating liquid was prepared by replacing malonic acid with citric acid in Prescription (8). When the same test as in Example 1 was conducted by using this treating liquid, there was observed the effect of reducing the occurrence of gear-stripe by 30%.

What is claimed is:

1. A liquid for treating offset masters which consists essentially of an aqueous solution containing more than 0.2 percent by weight of water-soluble ferrocyanate, from 0.1 to 12.0 percent by weight of water-soluble phosphate and from 0.1 to 10 percent by weight of at least one hydrophilic resin selected from the group consisting of (1) homopolymers of monomers having the formula I, (2) copolymers of different monomers having the formula I and (3) copolymers of monomer having the formula I and monomer having the formula II, wherein each of (1), (2) and (3) has a degree of polymerization of from 10 to 1000:

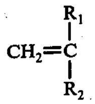

wherein $R_1$ is $-H$ or $-CH_3$, and $R_2$ is $-CONH_2$, $-CONHR_3$, $-CON(R_3)_2$, $-CONHCH_2OH$,

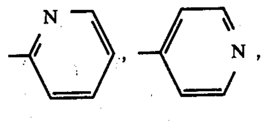

$-COO(CH_2)_2N(CH_3)_2$ or $-COO(CH_2)_2N(C_2H_5)_2$, and $R_3$ is alkyl having 1 to 8 carbon atoms;

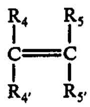

wherein $R_4$ and $R_{4'}$ are $-H$, $-CH_3$, $-COOH$, $-COOR_6$ or $-COOMe$; $R_5$ and $R_{5'}$ are $-H$, $-CH_3$, $-COOH$, $-COOR_6$, $-COOMe$ or $-CH_2COOH$, $R_6$ is $-CH_3$ or $-C_2H_5$ and Me is Mg, Ba, Ca, Co, Mn, Fe, Ni or Zn, with the provisos that when $R_4$ and $R_{4'}$ are the same, $R_5$ is not the same as $R_5$, and that when $R_4$ is not the same as $R_{4'}$, $R_5$ can be the same as or different from $R_{5'}$.

2. A treating liquid according to claim 1 in which the amount of said hydrophilic resin is from 0.5 to 5.0 percent by weight 3. A treating liquid according to claim 1, wherein said hydrophilic resin is acrylic acid-acrylamide copolymer.

4. A treating liquid according to claim 1, wherein said ferrocyanate is sodium ferrocyanate, potassium ferrocyanate or mixture thereof.

5. A treating liquid according to claim 1, wherein said water-soluble phosphate is primary ammonium phosphate, secondary ammonium phosphate, primary sodium phosphate, secondary sodium phosphate or mixture thereof.

6. A liquid for treating offset masters which consists essentially of an aqueous solution containing more than 0.2 percent by weight of water-soluble ferrocyanate, from 0.1 to 12.0 percent by weight of water-soluble phosphate, an organic acid in an amount effective to maintain the pH of said solution at less than 6 and from 0.1 to 10 percent by weight of at least one hydrophilic resin selected from the group consisting of (1) homopolymers of monomers having the formula I, (2) copolymers of different monomers having the formula I and (3) copolymers of monomer having the formula I and monomer having the formula II, wherein each of (1), (2) and (3) has a degree of polymerization of from 10 to 1000:

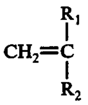

wherein $R_1$ is $-H$ or $-CH_3$, and $R_2$ is $-CONH_2$, $-CONHR_3$, $-CON(R_3)_2$, $-CONHCH_2OH$,

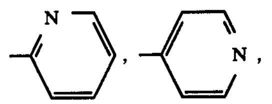

$-COO(CH_2)_2N(CH_3)_2$ or $-COO(CH_2)_2N(C_2H_5)_2$, and $R_3$ is alkyl having 1 to 8 carbon atoms;

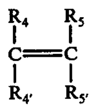

wherein $R_4$ and $R_{4'}$ are $-H$, $-CH_3$, $-COOH$, $-COOR_6$ or $-COOMe$; $R_5$ and $R_{5'}$ are $-H$, $-CH_3$, $-COOH$, $-COOR_6$, $-COOMe$ or $-CH_2COOH$, $R_6$ is $-CH_3$ or $-C_2H_5$ and Me is Mg, Ba, Ca, Co, Mn, Fe, Ni or Zn, with the provisos that when $R_4$ and $R_{4'}$ are the same, $R_5$ is not the same as $R_{5'}$ and that when $R_4$ is not the same as $R_{4'}$, $R_5$ can be the same as or different from $R_{5'}$.

7. A treating liquid according to claim 6 in which the amount of said hydrophilic resin is from 0.5 to 5.0 percent by weight.

8. A treating liquid according to claim 6, wherein said organic acid is malonic acid.

9. A treating liquid according to claim 6, wherein said hydrophilic resin is acrylic acid-acrylamide copolymer.

10. A treating liquid according to claim 15, wherein said ferrocyanate is sodium ferrocyanate, potassium ferrocyanate or mixture thereof.

* * * * *

UNITED STATES PATENT AND TRADEMARK OFFICE

CERTIFICATE OF CORRECTION

PATENT NO. : 4 116 698

DATED : September 26, 1978

INVENTOR(S) : Hazime Machida et al

It is certified that error appears in the above-identified patent and that said Letters Patent are hereby corrected as shown below:

Column 7, line 55; before the formula insert

---Formula I---.

Column 8, line 5; before the formula insert

---Formula II---.

line 12; change "$R_5$," to ---$R_5$,---.

line 45; before the formula insert

---Formula I---.

line 62; before the formula insert

---Formula II---.

Column 10, line 5; change "15" to ---6---.

Signed and Sealed this

*Sixteenth* Day of *January 1979*

[SEAL]

*Attest:*

RUTH C. MASON
*Attesting Officer*

DONALD W. BANNER
*Commissioner of Patents and Trademarks*